(12) United States Patent
Oya et al.

(10) Patent No.: US 10,483,818 B2
(45) Date of Patent: Nov. 19, 2019

(54) INSULATED WIRE, MOTOR COIL, AND ELECTRICAL OR ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Daisuke Muto, Tokyo (JP); Dai Fujiwara, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 16/104,457

(22) Filed: Aug. 17, 2018

(65) Prior Publication Data

US 2018/0358856 A1 Dec. 13, 2018

Related U.S. Application Data

(63) Continuation of application No. PCT/JP2017/005766, filed on Feb. 16, 2017.

(30) Foreign Application Priority Data

Feb. 19, 2016 (JP) .................................. 2016-029455

(51) Int. Cl.
*H01B 7/00* (2006.01)
*H02K 3/04* (2006.01)
(Continued)

(52) U.S. Cl.
CPC ............... *H02K 3/04* (2013.01); *H01B 3/305* (2013.01); *H01B 3/306* (2013.01); *H01B 3/427* (2013.01);
(Continued)

(58) Field of Classification Search
USPC .............. 174/110 R, 110 SC, 120 R, 120 SC
See application file for complete search history.

(56) References Cited

U.S. PATENT DOCUMENTS

| 2016/0307667 | A1* | 10/2016 | Fukuda | ................... B60L 50/10 |
| 2016/0307668 | A1 | 10/2016 | Oya et al. | |
| 2017/0004900 | A1 | 1/2017 | Ishii et al. | |

FOREIGN PATENT DOCUMENTS

| EP | 3239988 A | 11/2017 |
| JP | 2005-203334 A | 7/2005 |

(Continued)

OTHER PUBLICATIONS

International Search Report for PCT/JP2017/005766 dated Mar. 28, 2017.

(Continued)

*Primary Examiner* — William H. Mayo, III
(74) *Attorney, Agent, or Firm* — Birch, Stewart, Kolasch & Birch, LLP (57) ABSTRACT

An insulated wire, having at least one thermosetting resin layer and at least one thermoplastic resin layer in this order, as covering layers, on a conductor having a quadrilateral cross-section, wherein, in a coating thickness of the covering layers, in each side to be formed on 4 sides of the quadrilateral cross-section of said insulated wire, a difference between the maximum value and the minimum value is each 20 μm or less, and a value of the maximum value divided by the minimum value of the whole sides is 1.3 or more; a motor coil; and an electrical or electronic equipment.

9 Claims, 3 Drawing Sheets

(51) Int. Cl.
*H01F 5/00* (2006.01)
*H01F 5/06* (2006.01)
*H01B 7/02* (2006.01)
*H02K 3/30* (2006.01)
*H01B 3/30* (2006.01)
*H01B 3/42* (2006.01)
*H01B 13/06* (2006.01)
*H02K 15/04* (2006.01)
*H01B 13/14* (2006.01)

(52) U.S. Cl.
CPC ............ *H01B 7/00* (2013.01); *H01B 7/0009* (2013.01); *H01B 7/02* (2013.01); *H01B 7/0216* (2013.01); *H01B 13/065* (2013.01); *H01F 5/00* (2013.01); *H01F 5/06* (2013.01); *H02K 3/30* (2013.01); *H02K 15/04* (2013.01); *H01B 13/148* (2013.01); *Y02T 10/641* (2013.01)

(56) References Cited

FOREIGN PATENT DOCUMENTS

| | | |
|---|---|---|
| JP | 2009-232607 A | 10/2009 |
| JP | 2015-176730 A | 10/2015 |
| WO | WO 2015/098637 A1 | 7/2015 |

OTHER PUBLICATIONS

Extended European Search Report for corresponding European Application No. 17753291.8, dated Sep. 5, 2019.

* cited by examiner

INSULATED WIRE, MOTOR COIL, AND ELECTRICAL OR ELECTRONIC EQUIPMENT

CROSS-REFERENCE TO RELATED APPLICATIONS

This application is a Continuation of PCT International Application No. PCT/JP2017/005766 filed on Feb. 16, 2017, which claims priority under 35 U.S.C. § 119 (a) to Japanese Patent Application No. 2016-029455 filed in Japan on Feb. 19, 2016. Each of the above applications is hereby expressly incorporated by reference, in its entirety, into the present application.

TECHNICAL FIELD

The present invention relates to an insulated wire, a motor coil, and an electrical or electronic equipment.

BACKGROUND ART

In recent years, in electronic or electrical equipment (hereinafter, which may be simply referred to as electronic/electrical equipment), various performances, for example, heat resistance, mechanical properties, chemical properties, and electrical properties are become to be further highly enhanced more than ever before in those equipment, thus reliability has become required to be enhanced more than ever before in those equipment.

On the other hand, the electronic/electrical equipment represented by motors or transformers, has been progressed resulting in size reduction and improved performance in recent years. Thus, it becomes usual in many cases that insulated wires are used in such a way that the insulated wires are processed by winding (coil processing) to be winding wires and they are pushed into a quite small space to pack. Specifically, in order to enhance the performances of the rotating electrical machine, such as a motor, it is requested that how many winding wires produced above can be stored into a stator slot. That is, enhancement of the ratio of the sectional area of conductors to the sectional area of the stator slot (i.e. the space factor) has been required to be highly increased.

As a means for increasing the space factor, it has been lately attempted to use a rectangular wire in which the conductor has a cross-sectional shape similar to a quadrilateral (square or rectangle).

However, the use of the rectangular wire achieves a drastic effect on improvement of the space factor, while the corner having a rectangular cross-sectional shape is extremely vulnerable to bending, such as coil processing. Thus, there is a problem that a coating break occurs when processed under a strong pressure. In particular, it is known that with decrease in the curvature radius of the corner, breakage of the coating due to the bending becomes easy to occur.

Further, if enough distance between conductors cannot be secured by, for example, thinning the covering layer of the winding wire, insulating performances cannot be secured and also when the covering layer of the winding wire was damaged, this results in discharge from the exposed conductor of the winding wire.

In order to solve the forgoing problem, it is proposed to change the thickness of the covering layer on the conductor having a quadrilateral cross-sectional shape in a manner such that a protruding streak protruded on one side of the surface is formed and a concave groove to which the protruding streak can be inserted is formed on a backing surface side to said one side of the surface (see Patent Literature 1).

CITATION LIST

Patent Literatures

Patent Literature 1: JP-A-2009-232607

SUMMARY OF INVENTION

Technical Problem

Figure 6A:
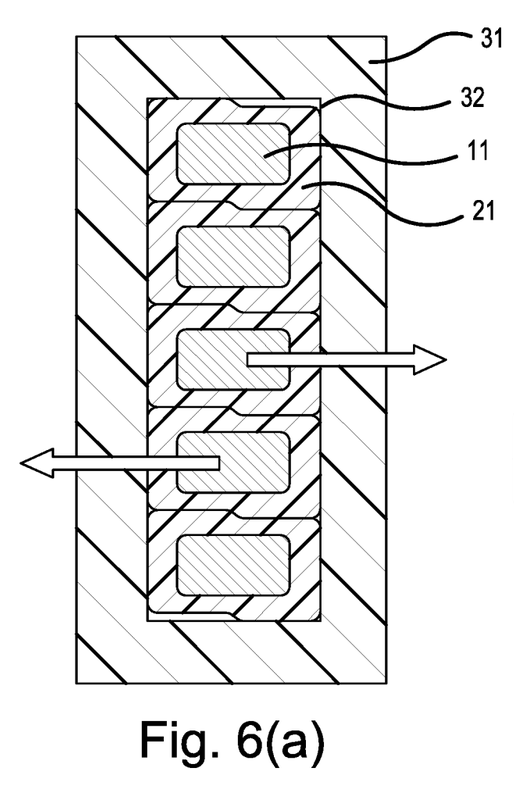
FIG. 6(a) is a schematic cross-sectional view showing a slot in which conventional insulated wire has been incorporated.

However, in the insulated wire proposed in the Patent Literature 1, for example, when a coil-processed wiring wire is incorporated in a slot and is subjected to a coil forming at a high pressure, displacement of the wire at the forming sometimes occurs, as shown in FIG. 6(a). In this case, there is a problem that a gap is created at the crossover between a covering layer of the upper insulated wire and a covering layer of the lower insulated wire, as shown in in FIG. 6(b), whereby an electrical current is discharged at this gap, which results in insulation failure. Herein, when the coil forming is performed at the high pressure, the form of the covering layer is also changed and a gap is created by not only the displacement of the wire, but also the change of said form.

As just described above, in the case where the winding wire in which the insulated wire has been subjected to a coil processing is incorporated in the stator slot, improvement of in-slot space factor of the conductor and improvement of insulation property caused by the covering layer are not easily combined.

Herein, in order to enhance the insulation property, it is necessary to enhance both partial discharge inception voltage (PDIV) and breakdown voltage (BDV).

The present invention is contemplated for providing an insulated wire in which a ratio (space factor) of a conductor cross-sectional area to a stator slot cross-sectional area is increased (improved) and also even in a case of coil forming at a high pressure, a change in the coating form of the covering layer is hard to occur, whereby excellent insulation property is achieved. Further, the present invention is contemplated for providing a motor coil, and an electrical or electronic equipment, each using the above-described insulated wire.

Solution to Problem

In view of the above-described problems in the background art, the inventors of the present invention have spent a lot of time for intensive studies in order to achieve a balance of the improvement in conductor space factor in the slot and improvement in insulation property of the wire. As a result, the inventors of the present invention have discovered that a balance between the improved conductor space factor in the slot and the improved insulation property can be realized at a high level, by forming a conductor cross-sectional shape in an approximate quadrilateral, providing a covering layer composed of a particular resin material on the outer periphery of this conductor, and then designing the covering layer whereby the coating thicknesses of 4 covering layer portions corresponding to 4 sides in this conductor cross-section of approximate quadrilateral meet a particular relationship.

The present invention has been made on the basis of these knowledges.

That is, the problems of the present invention were solved by the following means:

(1) An insulated wire, comprising at least one thermosetting resin layer and at least one thermoplastic resin layer in this order, as covering layers, on a conductor having a quadrilateral cross-section,
wherein, in each of 4 covering layer portions corresponding to 4 sides of the cross-section of said insulated wire, a difference between the maximum value and the minimum value of a coating thickness is each 20 μm or less, and in the whole of the above 4 covering layer portions, a value of the maximum value divided by the minimum value of the coating thickness is 1.3 or more.
(2) The insulated wire described in the item (1), wherein, in each of the 4 covering layer portions, an average coating thickness of the thermosetting resin layer is 5 μm or more.
(3) The insulated wire described in the item (1) or (2), wherein the covering layer portion giving the maximum value of the coating thickness in the whole of the above 4 covering layer portions, and the covering layer portion giving the minimum value of the coating thickness in the whole of the above 4 covering layer portions, lie next to each other.
(4) The insulated wire described in any one of the items (1) to (3), wherein, in the cross-section of the insulated wire, an average of the maximum value and the minimum value of the coating thickness of a pair of the covering layer portions corresponding to long sides facing each other is thinner than an average of the maximum value and the minimum value of the coating thickness of a pair of the covering layer portions corresponding to short sides facing each other.
(5) The insulated wire described in any one of the items (1) to (4), wherein a thermosetting resin which constitutes the thermosetting resin layer is selected from the group consisting of polyamideimide and polyimide.
(6) The insulated wire described in any one of the items (1) to (5), wherein a tensile elastic modulus at 25° C. of a thermosetting resin which constitutes the thermosetting resin layer is 2,000 MPa or more.
(7) The insulated wire described in any one of the items (1) to (6), wherein a thermoplastic resin which constitutes the thermoplastic resin layer comprises polyetheretherketone or polyphenylenesulfide.
(8) A motor coil comprising a lamination of more than one of the insulated wires described in any one of the items (1) to (7).
(9) An electrical or electronic equipment, comprising a built-in laminated body of more than one of the insulated wires described in any one of the items (1) to (7).

Effects of Invention

In the insulated wire of the present invention, the ratio (space factor) of a conductor cross-sectional area to a stator slot cross-sectional area can be increased and also even in a case of coil forming at a high pressure, a coating shape of the covering layer is hard to change, which results in excellent insulation property. Further, in the motor coil and the electrical or electronic equipment of the present invention, the ratio (space factor) of the conductor cross-sectional area to the slot cross-sectional area in the stator incorporating therein the insulated wires can be increased and also a coating shape of said insulated wires is hard to change, which results in excellent insulation property.

Specifically, the insulated wire of the present invention allows suppression of the shape deformation of the covering layer and occurrence of the gap, each of which becomes a problem particularly in a case where a thermoplastic resin is used for a covering layer, and a coil-processed winding wire is incorporated in a slot and is subjected to a coil forming at a high pressure. As a result, a balance between the improved space factor of the insulated wire in the slot and the improved insulation property can be realized. Further, the insulated wire of the present invention is excellent in production suitability, and the electrical or electronic equipment, such as a rotating motor using the insulated wire of the present invention, allows reduction in weight and size.

Other and further features and advantages of the invention will appear more fully from the following description, appropriately referring to the accompanying drawings.

BRIEF DESCRIPTION OF THE DRAWINGS

In FIGS. 6(a) and 6(b)

MODE FOR CARRYING OUT THE INVENTION

<<Insulated Wire>>

The insulated wire of the present invention (also which may be referred to as the insulated wire) is an insulated wire having at least one thermosetting resin layer (a layer of the resin being thermally set) and at least one thermoplastic resin layer in this order, as covering layers, on a conductor having a quadrilateral cross-section.

In the insulated wire of the present invention, in each of sides formed on 4 side portions of said conductor having the quadrilateral cross-section, a difference between the maximum value and the minimum value of a coating thickness of said covering layer is each 20 μm or less; and, a value of the maximum value (Tmax) divided by the minimum value (Tmin) of the coating thickness of the covering layers in whole side is 1.3 or more.

In other words, the insulated wire of the present invention is that, in each of 4 covering layer portions corresponding to 4 sides of the cross-section of said insulated wire, a difference between the maximum value and the minimum value of a coating thickness is each 20 μm or less, and in the whole of the above 4 covering layer portions, a value of the maximum value (Tmax) divided by the minimum value (Tmin) of said coating thickness is 1.3 or more.

Herein, the insulated wire is described with reference to its cross-sectional view. In the present invention, the term "cross-section" means a cross-section which is perpendicular to the longitudinal direction of the insulated wire. The cross-section of the covering layer means the same cross-section as the above, and the covering layer sequentially covers the conductor at this cross-sectional shape in the longitudinal direction of the conductor.

Further, when the thermosetting resin layer is provided, a coating and a baking are repeated, whereby the thickness of the thermosetting resin layer is adjusted to a particular thickness. However, in a case where the coating and baking is repeated using a thermosetting resin varnish having exactly the same composition simply in order to increase the thickness, the resultant thermosetting resin layer is counted as one layer.

Figure 1A:
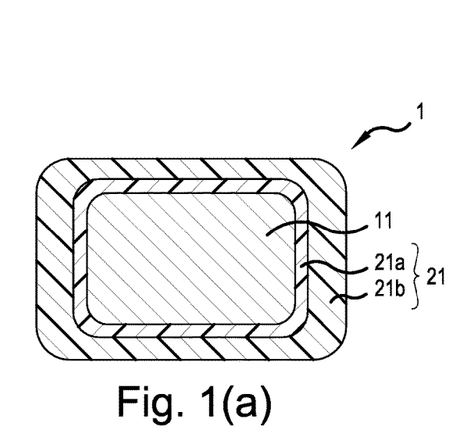
FIGS. 1(a) and 1(b) each are a schematic cross-sectional view showing a preferred embodiment of the insulated wire of the present invention.
Figure 1B:
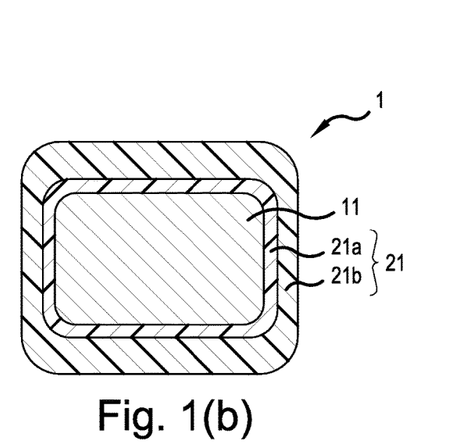

The insulated wire of the present invention is representatively an insulated wire 1 having a schematic cross-sectional shape, as shown in FIGS. 1(a) and 1(b).

Herein, FIGS. 1(a) and 1(b) each show a macroscopically viewed insulated wire. When microscopically viewed, the maximum value and the minimum value of a coating thickness of the covering layer may present in each of 4 sides. However, in the present invention, a difference between the maximum value and the minimum value of the coating thickness of the covering layer is 20 μm or less in each side. Further, with respect to the coating thickness of the covering layer, a ratio (Tmax/Tmin) of the maximum value (Tmax) of the maximum value in each side divided by the minimum value (Tmin) of the minimum value in each side, is 1.3 or more.

In FIG. 1(a), a covering layer 21 is applied on a quadrilateral conductor 11, and the covering layer has a lamination structure of a thermosetting resin layer 21a and a thermoplastic resin layer 21b. Herein, in FIG. 1(a), a coating thickness of the covering layer of 2 sides on the short side is prepared to be thicker than a coating thickness of the covering layer of 2 sides on the long side. However, as shown in FIG. 1(b), a coating thickness of the covering layer of 2 sides on the long side may be prepared to be thicker than a coating thickness of the covering layer of 2 sides on the short side.

In the present invention, the thermosetting resin layer may be composed of 2 or more layers. Further, the thermoplastic resin layer may be applied. Further, in addition to these layers, a layer having a particular function may be applied.

<Conductor>

As the conductor that can be used in the present invention, use may be made of any conductor that is usually used in insulated wires, and examples thereof include a metal conductor, such as a copper wire and an aluminum wire. The conductor that can be used in the present invention is preferably a copper conductor, and a copper to be used is preferably a low-oxygen copper whose oxygen content is 30 ppm or less, and further more preferably a low-oxygen copper whose oxygen content is 20 ppm or less or oxygen-free copper. In a case where the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

Further, in a case where the conductor is aluminum, based on a consideration of a required mechanical strength, various aluminum alloys may be used depending on the intended use. For example, for such a use as a rotating electrical machine, it is preferred to use a 99.00% or more-grade pure aluminum by which a high current value can be obtained.

In the present invention, a conductor having a quadrilateral (rectangular) cross-section is used. This allows increase in a conductor space facto in the stator slot.

The size of the conductor is determined according to its intended use and therefore is not specified in particular. However, in a case of the rectangular conductor, with respective to the length of one side, the width (long side) is preferably from 1.0 mm to 5.0 mm and more preferably from 1.4 mm to 4.0 mm, and the thickness (short side) is preferably from 0.4 mm to 3.0 mm and more preferably from 0.5 mm to 2.5 mm. However, the range of the conductor size by which the effect of the present invention is achieved is not limited to the above. Further, in the case of the rectangular conductor, although this is also varies according to its intended use, a rectangular cross-section is more common than a square cross-section. In a case where the intended use is a rotating electric machine, with respect to the chamfer (curvature radius r) of the 4 corners in the cross-section of the conductor having a rectangular shape, from the viewpoint of enhancing a conductor space factor in the stator slot, r is preferred with decreasing radius, whereas, from the viewpoint of suppressing a partial discharge phenomenon due to electric field concentration to 4 corners, r is preferred with increasing radius. Therefore, the curvature radius r is preferably 0.6 mm or less, and more preferably from 0.2 mm to 0.4 mm. However, the range of the curvature radius by which the effect of the present invention is achieved is not limited to the above.

Further, a quadrilateral conductor may be formed by intertwining or by combining a plurality of conductors.

<Thermosetting Resin Layer>

In the insulated wire of the present invention, it is particularly preferable that the thermosetting resin layer is applied directly in contact with a conductor and on the outer periphery of the conductor.

However, in accordance with the necessity or the intended use, the thermosetting resin layer may be applied on the outer periphery of the conductor through a thermoplastic resin layer, for example, a thermoplastic resin layer composed of an amorphous thermoplastic resin.

Meanwhile, by applying a thermosetting resin layer in contact with a conductor, adhesion between a covering layer and the conductor is enhanced.

Herein, the thermosetting resin layer which is applied directly in contact with a conductor and on the outer periphery of the conductor may be sometimes an enamel (resin) layer.

(Thermosetting Resin)

In the insulated wire of the present invention, a thermosetting resin which composes the thermosetting resin layer is not particularly limited, as long as it has been used in the insulated wire.

Examples thereof include polyamideimide (PAI), polyimide (PI), polyetherimide (PEI), polyesterimide (PEsI), polyurethane, polyester (PEst), polybenzimidazole, a melamine resin, an epoxy resin, and the like.

Of these resins, polyamideimide (PAI), polyimide (PI), polyetherimide (PEI), polyesterimide (PEsI), polyurethane, and polyester (PEst) are preferred. Especially, a thermosetting resin having an imide bond is preferred.

Specific examples of the thermosetting resin having an imide bond include: as in the above, polyamideimide (PAI), polyimide (PI), polyetherimide (PEI), and polyesterimide (PEsI).

In the present invention, a resin which is selected from the group consisting of polyamideimide (PAI) and polyimide (PI) is particularly preferred.

The polyamide (PAI), when compared to the other resins, has a lower thermal conductivity and a higher dielectric breakdown voltage, and a bake-setting can be conducted. The polyamideimide is not particularly limited. Examples thereof include: polyamideimides obtained by a usual method, for example, a method in which a tricarboxylic anhydride and a diisocyanate compound are directly reacted in a polar solvent, or a method in which a diamine compound is reacted with a tricarboxylic anhydride in a polar solvent, to previously introduce an imide bond to the reaction product, and then the reaction product is subjected to amidation using a diisocyanate compound.

Examples of the polyamideimide (PAI) include: trade name, HPC-9000, manufactured by Hitachi Chemical Co., Ltd., trade name, HI 406, manufactured by Hitachi Chemical Co., Ltd., and the like.

The polyimide is not particularly limited, but use may be made of: any of usual polyimide resins, such as a whole aromatic polyimide and a thermosetting aromatic polyimide. Alternatively, use may be made of polyimides obtained by a usual method in which an aromatic tetracarboxylic dianhydride and an aromatic diamine compound are reacted in a polar solvent to obtain a polyamide acid solution, and then the obtained polyamide acid solution is subjected to imidization by a thermal treatment at the time of baking.

Examples of the polyimide (PI) include: trade name, U-IMIDE, manufactured by Unitika Ltd.; trade name, U-VARNISH-A, manufactured by Ube Industries, Ltd.; and trade name, Pyre-M.L., manufactured by 1ST.

The polyetherimide (PEI) is permissible, as long as it is a thermosetting resin having an ether bond and an imide bond in the molecule. For example, it is also possible to use a product obtained by using a polyamidic acid solution obtained by reacting, in a polar solvent, an aromatic tetracarboxylic acid dianhydride and an aromatic diamine having an ether bond in the molecule, and by subjecting the polyamidic acid solution to imidization due to a heating treatment for baking in the covering step.

Examples of the polyetherimide (PEI) include: trade name, ULTEM1000, manufactured by SABIC, and the like.

The polyesterimide (PEsI) is not particularly limited, as long as it is a polymer having an ester bond and an imide bond in the molecule, and it is thermosetting. For example, it is also possible to use a product obtained by forming an imide bond from a tricarboxylic acid anhydride and an amine compound, and forming an ester bond from an alcohol and a carboxylic acid or an alkyl ester thereof, and making a free acidic group or anhydride group of the imide bond join in the ester formation reaction. As such a polyesterimide, for example, it is also possible to use a product obtained by reacting a tricarboxylic acid anhydride, a dicarboxylic acid compound or its alkyl ester, an alcohol compound, and a diamine compound, in accordance with a known method.

Examples of the polyesterimide (PEsI) include: trade name: Neoheat8600A, manufactured by Toutoku Toryo Co., Ltd., and the like.

In the present invention, the tensile elastic modulus at 25° C. of the thermosetting resin is preferably 2,000 MPa or more, more preferably 2,000 to 9,000 MPa, still more preferably 2,500 to 8,000 MPa, and particularly preferably 3,000 to 7,000 MPa.

The tensile elastic modulus set to the foregoing range allows maintenance of the breakdown voltage at a higher level even after a processing was made in a strict manner.

The tensile elastic modulus of the thermosetting resin can be measured by the following method.

A sheet sample is preliminarily prepared (for example, a sheet sample having the dimensions of 10 mm length, 2 mm width, and 0.05 mm thickness). The tensile elastic modulus at 25° C. is determined by measuring this sheet sample using a viscoelastic spectrometer, for example, viscoelastic spectrometer (DMA8000) manufactured by Perkin Elmer Japan Co., Ltd., under the following conditions: measurement mode, tensile mode; frequency, 1 Hz; measurement temperature, with a change in the temperature at a temperature increase rate of 5° C./min.

As the thermosetting resin, one kind may be used alone, or two or more kinds may be used in combination.

(Additive)

Adhesion strength of the thermosetting resin to the conductor can be further enhanced by adding thereto any of additives, such as trialkyl amines, an alkoxylated melamine resin, and a thiol compound and therefore addition of any of these additives is favorable.

Preferable trialkyl amines include trialkyl amines having a lower alkyl group, such as trimethyl amine, triethyl amine, tripropyl amine, and tributyl amine. Of these amines, trimethyl amine and triethyl amine are more preferable in the points of both flexibility and adhesion property.

As the alkoxylated melamine resin, the use can be made of melamine resins substituted with a lower alkoxy group, such as a butoxylated melamine resin and a methoxylated melamine resin, and in the point of compatibility of the resin, a methoxylated melamine resin is preferable.

The thiol compound means an organic compound having a mercapto group (—SH), and specific examples thereof include pentaerythritol tetrakis(3-mercaptobutylate), 1,3,5-tris(3-mercaptobutyloxyethyl)-1,3,5-triazine-2,4,6(1H,3H,5H)-trione, butanediol bis(3-mercaptobutylate), butanediol bis(3-mercaptopentylate), 5-amino-1,3,4-tiadiazole-2-thiol, trimethylolpropane tris(3-mercaptobutylate), 5-methyl-1,3,4-thiadiazole-2-thiol, 2,5-dimercapto-1,3,4-thiadiazole, 2-amino-1,3,4-thiadiazole, 1,2,4-thiadiazole-3-thiol, 3-amino-5-mercapto-1,2,4-triazole, and the like.

The content of the above-described additives is not particularly limited. However, with respect to 100 mass parts of the thermosetting resin, 5 mass parts or less of the additive is preferable and 3 mass parts or less of the additive is more preferable.

(Coating Thickness of Thermosetting Resin Layer)

An average coating thickness of the thermosetting resin layer is preferably 5 μm or more, more preferably 10 μm or more, still more preferably 15 μm or more, and particularly preferably 20 μm or more. Meanwhile, the upper limit of the average coating thickness is preferably 60 μm or less. Especially, it is preferable that the above-described average coating thickness is fulfilled in any of sides of the cross-sectional shape.

Herein, for example, in order to improve adhesion of the thermosetting resin layer to a thermoplastic resin layer of the outer layer, a convexo-concave structure may be formed in each of the sides of the thermosetting layer so that it has a maximum value and a minimum value in a microscale observation.

Further, in a pair of long sides facing each other and a pair of short sides facing each other, of 4 sides (2 pairs of sides facing each other) in the cross-sectional shape, the coating thickness of the long side and the short side may be different or the same. However, it is preferable that the coating thickness of the long side and the short side is the same.

<Thermoplastic Resin Layer>

In the insulated wire of the present invention, at least one thermoplastic resin layer is applied above at least one thermosetting resin layer, and the thermoplastic resin layer may be a single layer or may have a laminate structure composed of 2 layers or more.

(Thermoplastic Resin)

Examples of the thermoplastic resin constituting the thermoplastic resin layer include: commodity engineering plastics, such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and, in addition, super engineering plastics, such as polysulfone (PSF), polyether sulfone (PES), polyphenylene sulfide (PPS), polyarylate (U polymer), polyamide imide, polyether ketone (PEK), polyarylether ketone (PAEK), tetrafluoroethylene/ethylene copolymer (ETFE), polyether ether ketone (PEEK) (including a modified polyether ether ketone (modified PEEK)), tetrafluoroethylene/perfluoalkyl vinyl ether copolymer (PFA), polytetrafluoroethylene (PTFE), thermoplastic polyimide resin (TPI), polyamideimide (PAI), and liquid crystal polyester; and further polymer alloy composed of polyethylene terephthalate (PET) or polyethylene naphthalate (PEN) as a base resin, ABS/polycarbonate, NYLON 6,6, aromatic polyamide resin (aromatic PA), polymer alloys containing the foregoing engineering plastics, such as polyphenylene ether/NYLON 6,6, polyphenylene ether/polystyrene, and polybutylene terephthalate/polycarbonate.

Whether the thermoplastic resin is crystalline or non-crystalline does not matter.

Further, whether the thermoplastic resin is one kind or a mixture of 2 kinds or more does not matter.

Of the thermoplastic resins, polyamide (PA), polysulfone (PSF), polyethersulfone (PES), polyphenylenesulfide (PPS), polyetherketone (PEK), polyarylketone (PAEK), and polyetheretherketone (PEEK) are preferable. Polyetheretherketone (PEEK), polyetherketone (PEK), polyaryletherketone (PAEK), polyphenylenesulfide (PPS), and polyamide (PA) are more preferable. Polyetheretherketone (PEEK), polyphenylenesulfide (PPS), and polyamide (PA) are still more preferable. In particular, it is preferred in terms of resistance to solvent that the thermoplastic resin contains polyetheretherketone (PEEK) or polyphenylsulfide (PPS).

The thermoplastic resin layer is ordinarily formed by extrusion-forming because of using a thermoplastic resin.

(Additive)

In the thermoplastic resin layer, any of variety of additives may be contained in accordance with an intended use.

Examples of the foregoing additives include a pigment, a cross-linker, a catalyst, and an antioxidant.

The content of such additives is preferably from 0.01 to 10 parts by mass with respect to 100 parts by mass of the resin which constitutes the thermoplastic resin layer.

In the present invention, in a thermoplastic resin layer of an outermost layer which covers a conductor, of the thermoplastic resin layer, it is also possible to use a self-lubricating resin formed by dispersing and mixing a wax and a lubricant according to an ordinary method.

As the wax, usually materials for use may be used without any particular limitation. Examples thereof include: a synthetic wax, such as polyethylene wax, petroleum wax, and paraffin wax; and a natural wax, such as carnauba wax, candelilla wax, and rice wax.

The lubricant may be also used without any particular limitation. Examples thereof include silicone, silicone macromonomer, a fluorine resin, and the like.

(Coating Thickness of Thermoplastic Resin Layer)

The average coating thickness of the thermoplastic resin layer is preferably from 20 to 250 µm, more preferably from 30 to 190 µm, still more preferably from 40 to 150 µm, and particularly preferably from 50 to 130 µm. Further, in a pair of the long sides facing each other and a pair of the short sides facing each other of 4 sides (2 pairs of sides facing each other) in the cross-sectional shape of the thermoplastic resin layer, whether the average coating thickness of the long side and the short side is different from each other or the same is no matter. However, it is preferable that the short side is thicker than the long side.

The average coating thickness of the long side is preferably from 25 to 150 µm, more preferably from 30 to 150 µm, still more preferably from 40 to 120 µm, and particularly preferably from 50 to 100 µm.

On the other hand, the average coating thickness of the short side is preferably from 15 to 250 µm, more preferably from 40 to 200 µm, still more preferably from 50 to 150 µm, and particularly preferably from 60 to 150 µm.

The present invention is not limited to these embodiments.

In the present invention, the coating thickness and the cross-sectional shape of the covering layer are more easily and preferably tailored by a thermoplastic resin layer than a thermosetting resin layer <Coating Layer Shape and Coating Thickness>

In the present invention, a difference between the maximum value and the minimum value of a coating thickness of the covering layer is each 20 µm or less in each of sides formed on 4 side portions of the conductor having a quadrilateral cross-section; and with respect to the coating thickness of the covering layers in whole side, a ratio (Tmax/Tmin) of the maximum value (Tmax) divided by the minimum value (Tmin) of said coating thickness is 1.3 or more.

The above Tmax/Tmin is preferably from 1.3 to 6.0, more preferably from 1.5 to 4.0, still more preferably more than 1.5 and 4.0 or less, particularly preferably from 1.6 to 4.0, and most preferably from 1.7 to 3.0.

Further, the side having the Tmax and the side having the Tmin, as described above, are preferably a side lying next to each other. Specifically, a covering layer portion giving the maximum value of the coating thickness in the whole of the above 4 covering layer portions corresponding to 4 sides of the cross-section of the insulated wire and a covering layer portion giving the minimum value of the coating thickness in the whole of the above 4 covering layer portions preferably lie next to each other.

In the present invention, the insulated wire has a cross-sectional shape as shown in FIGS. 1(a) and 1(b), when macroscopically viewed. Therefore, the coating thickness of the covering layer can be measured by an analysis of the image at 500-fold magnification in 4 sides other than the portions curved by a curvature of the chamfer of 4 corners based on the cross-sectional shape of the conductor, using a microscope (for example, Microscope VHX-2000 manufactured by Keyence Corporation).

Further, in a pair of the long sides facing each other and a pair of the short sides facing each other of 4 sides (2 pairs of the sides facing each other) in the cross-sectional shape of the covering layer, whether an average coating thickness of the 2 long sides is different from each other or the same is no matter. However, it is preferable that the average coating thickness of the 2 long sides is the same. On the other hand, whether an average coating thickness of the 2 short sides is different from each other or the same is no matter. However, it is preferable that the average coating thickness of the 2 short sides is the same.

The average coating thickness of the long side and the short side in the cross-sectional shape of the covering layer is appropriately adjusted for enhancement in the space factor of the insulated wire in the stator slot. It is preferable that the average coating thickness of the side in the direction of laminating a plurality of insulated wires is relatively thin.

Figure 6B:
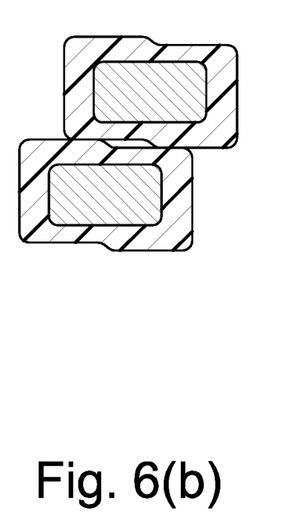
FIG. 6(b) is a schematic cross-sectional view showing a state in which 2 insulated wires are jolted out of alignment.

As shown in FIGS. 6(a) and FIG. 6(b), in a case where the insulated wires are arranged in a manner such that the short side of one insulated wire is in contact with a lateral side of the stator slot and the long side thereof is in contact with another insulated wire, a high voltage is applied between the short side of the insulated wire and the stator and therefore it is preferred to make the average coating thickness of the short side thicker. For this reason, when storing the insulated wires in the stator slot, in an adverse case where one insulated wire is laminated with another insulated wire in the direction of the short side of the one insulated wire, it is preferred to make the average coating thickness of the long side thicker.

In the present invention, the average coating thickness of the covering layer on the long side is preferably 35 to 200 μm, more preferably 40 to 160 μm, and still more preferably 50 to 120 μm.

On the other hand, the average coating thickness of the covering layer on the short side is preferably 40 to 250 μm, more preferably 50 to 180 μm, and still more preferably 60 to 130 μm.

As described above, the coating thickness of the long side and the short side of the covering layer is appropriately adjusted when storing the insulated wires in the stator slot. Accordingly, in the present invention, a configuration may be designed so that, in 4 sides (2 pairs of the sides facing each other) of the covering layer, an average of the maximum value and the minimum value of the coating thickness of a pair of the long sides facing to each other is made thinner than an average of the maximum value and the minimum value of the coating thickness of a pair of the short sides facing to each other, or a relationship of the coating thickness between the long side and the short side in thickness may be reversed. Especially, the configuration designed so that, in the cross-section of the above-described insulated wire, an average of the maximum value and the minimum value of the coating thickness of a pair of the covering layer potions corresponding to the long sides facing to each other is made thinner than an average of the maximum value and the minimum value of the coating thickness of a pair of the covering layer potions corresponding to the short sides facing to each other, is a preferable embodiment for the insulated wire of the present invention.

As a ratio of average coating thickness of the covering layer at each of the short side and the long side, or a ratio of an average of the maximum value and the minimum value of the coating thickness of the covering layer at each of the short side and the long side, the long side is preferably from 20 to 500 with respect to 100 of the short side. Meanwhile, in a case where an average coating thickness of the maximum value and the minimum value of the coating thickness of the covering layer at the long side is thinner than that at the short side, the long side is preferably from 40 to 100 and more preferably from 50 to 90 with respect to 100 of the short side. In other words, in the cross-section of the insulated wire, provided that an average coating thickness of the maximum value and the minimum value of the coating thickness of 2 covering layer portions corresponding to 2 short sides is 100, an average of the maximum value and the minimum value of the coating thickness of 2 covering layer portions corresponding to 2 long sides facing to each other is preferably from 40 to 100, and more preferably from 50 to 90. However, the present invention is not limited to this form.

In the present invention, in each side of 4 side portions in the cross-sectional shape of the covering layer applied on a conductor, a difference between the maximum value and the minimum value of the coating thickness of the covering layer is each 20 μm or less. However, the lower limit of these differences between the maximum value and the minimum value is more than 0 μm preferably at least in one side, more preferably at least in two sides, still more preferably at least in three sides, and still more preferably in each of four sides.

Herein, a differences between the maximum value and the minimum value of the coating thickness of the covering layer in each side of the above-described 4 side portions is preferably from 0 to 15 μm, more preferably from 0 to 10 μm, and still more preferably from 0 to 5 μm.

The maximum value and the minimum value of the coating thickness of the covering layer in each of these sides are the same or different from each other in each side.

However, since one insulated wire is ordinarily laid on the top of another insulated wire at the long side thereof in the slot, it is preferable that, in a pair of the long sides facing each other, a difference between the maximum value and the minimum value of the coating thickness of the covering layer in each long side is the same.

Figure 4A:
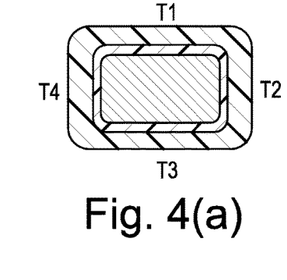
FIGS. 4(a), 4(b) and 4(c) each are a schematic cross-sectional view showing a preferred embodiment of the insulated wire as produced in any of Examples.
Figure 4B:
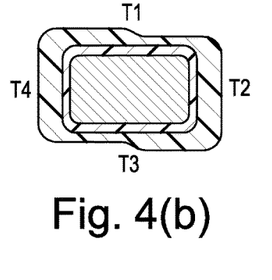
Figure 4C:
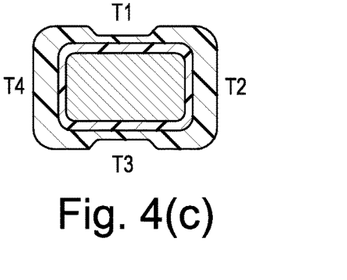

Meanwhile, in the sides of T1, T2, T3, and T4 shown in FIGS. 4(a) to 4(c), whether the side shapes of T1 and T3 are a symmetrical shape or an antisymmetric shape with respect to the conductor does not matter. Further, in the present invention, the inverse symmetry (for example, FIG. 4(b) shows an inverse symmetry and FIG. 4(c) shows a symmetry) is better in terms of adhesion.

In the present invention, the maximum value of the coating thickness at the long side of the covering layer is preferably from 50 to 250 μm, more preferably from 60 to 180 μm, and still more preferably from 70 to 140 μm.

On the other hand, the minimum value of the coating thickness at the long side of the covering layer is preferably from 30 to 200 μm, more preferably from 40 to 160 μm, and still more preferably from 50 to 130 μm.

Further, the maximum value of the coating thickness at the short side of the covering layer is preferably from 50 to 300 μm, more preferably from 55 to 300 μm, still more preferably from 60 to 260 μm, and particularly preferably from 70 to 220 μm.

On the other hand, the minimum value of the coating thickness at the short side of the covering layer is preferably from 45 to 250 μm, more preferably from 50 to 250 μm, still more preferably from 60 to 210 μm, and particularly preferably from 70 to 180 μm.

<<Method of Producing Insulated Wire>>

In the present invention, the insulated wire is produced by coating and baking a thermosetting resin varnish on the periphery of a conductor to form a thermosetting resin layer, and subjecting a composition containing a thermoplastic resin to extrusion-forming to form a thermoplastic resin layer on the thermosetting resin layer.

The thermosetting resin varnish contains an organic solvent and the like, so as to make the thermosetting resin be a varnish.

The organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

Of these organic solvents, in view of high solubility, high reaction acceleration property and the like, amide-based solvents, and urea-based solvents are preferred; and in view of a solvent without a hydrogen atom that is apt to inhibit a crosslinking reaction due to heating, N-methyl-2-pyrrolidone (NMP), N,N-dimethylacetamide, N,N-dimethylethyleneurea, N,N-dimethylpropyleneurea, and tetramethylurea are more preferred; and N,N-dimethylacetamide, N-methyl-2-pyrrolidone, N,N-dimethylformamide, and dimethylsulfoxide are particularly preferred.

Regarding the organic solvent and the like, one kind may be used alone, or two or more kinds may be used in mixture.

As a thermosetting resin varnish, commercially-available products may be used as mentioned above. In this case, since the thermosetting resin is dissolved in an organic solvent, the varnish contains the organic solvent.

The method of coating the thermosetting resin varnish on the conductor may be pursued in the usual manner. Examples of the coating method include: a method of employing a die for a varnish coating, which has been manufactured so as to be similar to the shape of the conductor; and a method of employing a die that is called "universal die", which has been formed in a curb shape, when the cross-section shape of the conductor is quadrangular.

The conductor having the thermosetting resin varnish coated thereon is baked by a baking furnace in a usual manner. Although specific baking conditions depend on the shape of a furnace to be used, in the case where the furnace is an about 8 m-sized vertical furnace by natural convection, the baking can be achieved by setting the passing time period to 10 to 90 sec at the furnace temperature of 400 to 650° C.

In the present invention, in a case of providing the thermoplastic resin layer on the thermosetting resin layers, for example, using the conductor having the thermosetting resin layers formed thereon (also called as an enamel wire) as the core wire, by extrusion-covering a composition containing the thermoplastic resin on the enamel wire using a screw of the extruder, to form the thermoplastic resin layer, to thereby make it possible to obtain the insulated wire. On this occasion, the extrusion-covering of the thermoplastic resin layer is carried out, using an extrusion die at a temperature (i.e. the glass transition temperature or higher, when the non-crystalline resin is used) of the melting point or higher of the thermoplastic resin, so that the cross-sectional outer shape of the extrusion-covering resin layer has a similarity shape or an almost similarity shape of the conductor and takes the shape, by which a predetermined thickness of each of the side portion and the corner, or the given maximum thickness and the minimum thickness is obtained. The thermoplastic resin layer can be also formed by using a thermoplastic resin together with an organic solvent and the like.

In a case of using a non-crystalline thermoplastic resin, aside from the extrusion-forming, the thermoplastic resin layer can be also formed by coating and baking a varnish of the thermoplastic resin having been dissolved in an organic solvent or the like on an enamel wire, using a die whose shape has the similarity in the shape of the conductor.

As the organic solvent for the thermoplastic resin varnish, the organic solvents cited in the thermosetting resin varnish are preferable.

Further, specific baking conditions depend on a shape of the furnace to be used. However, such conditions as described about the thermosetting resin are preferable.

In the present invention, however, the extrusion-forming is preferable from the viewpoint of the production suitability taking into account a production cost.

<Characteristics of Insulated Wire>

The insulated wire of the present invention achieves a high partial discharge inception voltage (PDIV) and a high breakdown voltage (BDV).

The partial discharge inception voltage is high in both (1) a partial discharge inception voltage at a minimum side portion containing the minimum value of the coating thickness at the long side and (2) a partial discharge inception voltage at a maximum coating thickness portion containing the maximum value of the coating thickness at the long side, each of which was measured as described in Example.

The partial discharge inception voltage in (1) is preferably from 1,000 to 3,000 Vp, more preferably from 1,200 to 2,750 Vp, still more preferably from 1,250 to 2,750 Vp, and particularly preferably from 1,300 to 2,500 Vp.

Herein, it is considered that because the partial discharge inception voltage in (1) is a property which is not expected in the design of a motor, a smaller variation (the absolute value of a difference) from the above-described (2) a partial discharge inception voltage at the maximum coating thickness portion containing the maximum value of the coating thickness at the long side, has high reliability.

A ratio of the above-described variation to the partial discharge inception voltage in the above-described (1) is preferably 55% or less, more preferably from 0 to 40%, and still more preferably from 0 to 30%.

The partial discharge inception voltage in (2), although it depends on a valance with space factor, is preferably from 1,000 to 2,500 Vp, more preferably from 1,100 to 2,200 Vp, still more preferably from 1,200 to 2,200 Vp, particularly preferably from 1,300 to 2,000 Vp, and most preferably from 1,500 to 1,800 Vp.

As to the breakdown voltage, in the present invention, a breakdown voltage after the notched edgewise bending is conducted, which is measured by a method shown in Example, is high in particular.

The forgoing breakdown voltage is good enough to be 1 kV or more, more preferably 5 kV or more, and still more preferably 8 kV or more.

<<Coil, and electrical or electronic equipment>>

The insulated wire of the present invention is applicable to a field which requires the electrical property (e.g. the resistance to voltage) and the heat resistance, such as a rotating electrical machine and various kinds of electrical or electronic equipment, as a coil. For example, the insulated wire of the present invention is used for a motor, a transformer and the like, which can compose high-performance rotating electrical machine and electrical or electronic equipment. In particular, the insulated wire is preferably used as a winding wire for a driving motor of hybrid vehicles (HVs) and electrical vehicles (EVs). In this way, it can be provided electrical or electronic equipment, in particular a driving motor for HVs and EVs, each employing the insulated wire of the present invention, as a coil. Meanwhile, in a case where the insulated wire of the present invention is used for a motor coil, the insulated wire may be also called as an insulated wire for a motor coil. In particular, a coil produced by coil-processing the insulated wire of the present invention having the above-described excellent property allows further size reduction or improved performance of the electrical or electronic equipment. Accordingly, the insulated wire of the present invention is preferably used as a winding wire that is used in a driving motor for HVs and EVs of which size reduction and improved performance are remarkable in recent years.

The coil of the present invention is good enough to have a form suitable for a variety of electrical or electronic equipment. Examples thereof include: a coil formed by coil-processing the insulated wire of the present invention; a coil in which, after bending the insulated wire of the present invention, predetermined portions thereof are electrically connected to each other; and the like.

The coil formed by coil-processing the insulated wire of the present invention is not limited in particular, and examples thereof include a coil formed by spirally winding around a lengthy insulated wire. In the forgoing coil, the winding number and the like of the insulated wire is not limited in particular. Ordinarily, when the insulated wire is wound around, an iron core or the like is used.

Figure 2:
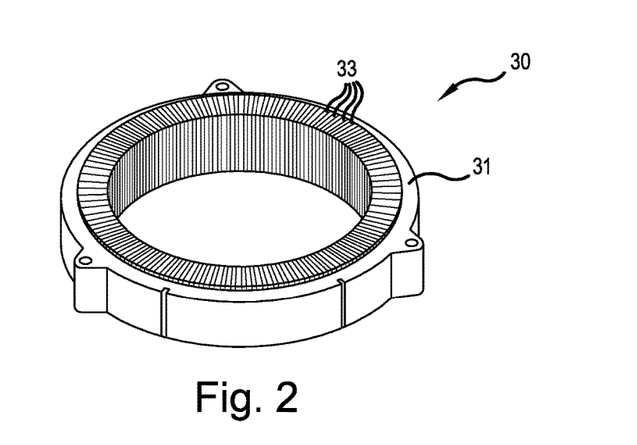
FIG. 2 is a schematic perspective view showing a preferred embodiment of the stator that is used in the electrical or electronic equipment of the present invention.
Figure 3:
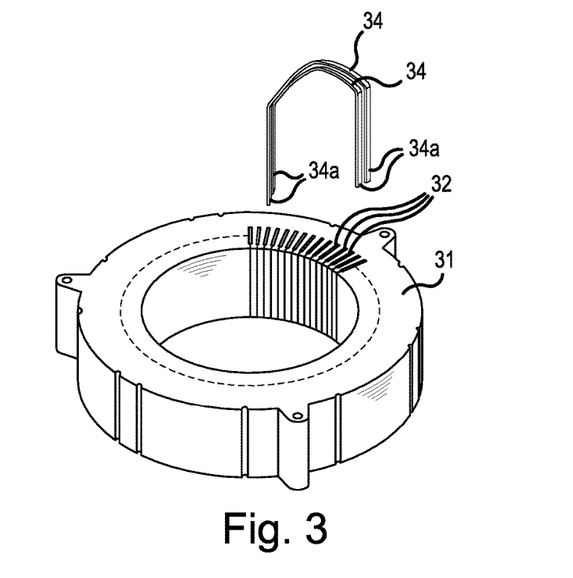
FIG. 3 is a schematic exploded perspective view showing a preferred embodiment of the stator that is used in the electrical or electronic equipment of the present invention.

The coil in which, after bending the insulated wire of the present invention, predetermined portions thereof are electrically connected to each other includes a coil to be used in a stator, such as a rotating electric machine and the like. Examples of the foregoing coil include a coil 33 (see FIG. 2) prepared, as shown in FIG. 3, by cutting the insulated wire of the present invention to a predetermined length and bending the thus-cut wire in a U shape or the like, to prepare more than one wire segment 34, and then alternately connecting two U-shaped or the like open ends (terminals) 34a of each of the wire segments 34.

The electrical or electronic equipment formed by employing the forgoing coil is not limited in particular. As a preferable embodiment of the electrical or electronic equipment, examples thereof include a rotating electric machine (in particular, a driving motor for HVs and EVs) equipped with a stator 30, as shown in FIG. 2. This rotating electric machine can be figured in the same manner as the conventional one, except for equipment of the stator 30.

The stator 30 can be figured in the same manner as the conventional one, except for the wire segments 34 being formed of the insulated wire of the present invention. Specifically, the stator 30 has a stator core 31, and a coil 33 in which, for example as shown in FIG. 3, a wire segment 34 composed of the insulated wire of the present invention is incorporated in a slot 32 of a stator core 31 and open ends 34a are electrically connected. Herein, the wire segments 34 may be incorporated in the slot 32 in a single segment, but preferably in a pair of two segments as shown in FIG. 3. In this stator 30, the coil 33 in which the wire segment 34 having subjected to the bending as described above are alternately connected through open ends 34a of its two terminals is stored in a slot 32 of a stator core 31. In this moment, the wire segment 34 may be stored in the slot 32 after connecting the open ends 34a of the wire segment 34, or alternatively after storing the wire segment 34 in the slot 32, the open ends 34a of the wire segment 34 may be subjected to bending and then to connecting.

Meanwhile, the motor coil of the present invention is a laminate body composed of more than one insulated wire of the present invention. In the electrical or electronic equipment of the present invention, the laminate body composed of more than one insulated wire of the present invention is incorporated. In the present invention, it is preferable in the motor coil and the electrical or electronic equipment that a plurality of wires which is different from each other in terms of shape or thickness is used in combination. In particular, it is preferable in the motor coil that the insulated wire of the present invention is laminated in a manner such that the sides having the minimum value (Tmin) of the minimum value of the coating thickness of each covering layer lie next to each other.

This is specifically described below.

The configuration in which, with respect to a portion put in the slot of the stator core, the covering of the long side is made thinner than the covering of the short side allows size reduction in the circumferential direction of the stator core without lowering the conductor space factor per slot. Further, by putting only a part of wires in the slot with a difference in the thickness of the covering between the long side and the short side, the part of wires can be used as a spacer for keeping an insulating distance at the coil end portion. By doing so, an insulating paper can be eliminated, and resultantly this allows size reduction of the motor. However, the present invention is not limited to this embodiment.

The use of the insulated wire of the present invention, for example, allows increase in a ratio (space factor) of the conductor cross-sectional area to the stator core slot cross-sectional area, and allows improvement in property of the electrical or electronic equipment.

The insulated wire of the present invention is useful as a coil in the field which needs electrical property (resistance to voltage) and heat resistance, such as a rotating electric machine and a variety of electrical or electronic equipment. For example, the insulated wire of the present invention is used for a motor, a transformer, and the like, and these are able to constitute a high performance rotating electric machine and electrical or electronic equipment. In particular, the insulated wire of the present invention is preferably used as a winding wire for a driving motor of the hybrid vehicle (HV) and the electric vehicle (EV).

EXAMPLES

The present invention will be described in more detail based on examples given below, but the invention is not meant to be limited by these.

Example 1

In Example 1, the insulated wire was produced, of the cross-sectional around rectangular shape, as shown in FIG. 4(a).

As a conductor 11, use was made of: a rectangular conductor having a rectangular cross-section (long side 3.2 mm×short side 1.5 mm, curvature radius of chamfered edges at four corners r=0.3 mm) (copper having an oxygen content of 15 ppm).

A polyamideimide (PAI) varnish (trade name: HPC-9000, manufactured by Hitachi Chemical, tensile modulus at 25° C.: 4,100 MPa) was coated on a surface of the conductor 11, with using a die having a similarity shape of a cross-sectional shape with the conductor, followed by passing through a 5 m-long natural convection-type baking furnace controlled the furnace inside temperature to 300 to 500° C. at the speed of 5 to 10 seconds passing time. This baking step was repeated several times, to thereby form the thermosetting resin layers with thickness 30 μm, thereby to give an enamel wire composed of the thermosetting resin layers.

The thus-obtained enamel wire was used as a core wire, and a thermoplastic resin layer was formed on the outer periphery of the core wire, with using an extruder equipped with a 30 mm-full flight screw (screw L/D=25, screw compression ratio=3). As the thermoplastic resin, use was made of polyetheretherketone (trade name: KetaSpire KT-820, manufactured by Solvay Specialty Polymers), and extrusion-covering of the thermoplastic resin was carried out at 370° C. (the temperature of extrusion die), with using an extrusion die in a manner such that an outer cross-sectional shape and the thickness of the thermoplastic resin layer would be those shown in Table 1.

Thus, the insulated wire was prepared, which had the thermosetting resin layers and the thermoplastic resin layer, each of which was provided on the conductor.

Example 2

In Example 2, the insulated wire was produced, of the cross-sectional around rectangular shape, as shown in FIG. 4(a).

The insulated wire was produced in the same manner as in Example 1, except that the thickness of the thermosetting resin layers and the shape and the thickness of the thermoplastic resin layer would be changed to those shown in Table 1.

Example 3

In Example 3, the insulated wire was produced, of the cross-sectional around rectangular shape, as shown in FIG. 4(a).

The insulated wire was produced in the same manner as in Example 1, except that the resin of the thermosetting resin layers was changed to polyimide (PI) varnish (trade name: U-VARNISH-A, manufactured by Ube Industries, Ltd., tensile modulus at 25° C.: 3,730 MPa), and that the thickness of the thermosetting resin layers and the shape and the thickness of the thermoplastic resin layer would be changed to those shown in Table 1.

Example 4

In Example 4, the insulated wire was produced, of the cross-sectional around rectangular shape, as shown in FIG. 4(a).

The insulated wire was produced in the same manner as in Example 1, except that the resin of the thermosetting resin layers was changed to polyester (PEst) varnish (trade name: LITON3300KF, manufactured by Toutoku Toryo Co., Ltd., tensile modulus at 25° C.: 2,000 MPa), that the thermoplastic resin was changed to polyphenylene sulfide (PPS) (trade name: PPS FZ-2100, manufactured by DIC Corporation), respectively, and that the thickness of the thermosetting resin layers and the shape and the thickness of the thermoplastic resin layer would be changed to those shown in Table 1.

Example 5

In Example 5, the insulated wire was produced, of the cross-sectional around rectangular shape, as shown in FIG. 4(a).

The insulated wire was produced in the same manner as in Example 1, except that the resin of the thermosetting resin layers was changed to polyesterimide (PEsI) varnish (trade name: Neoheat8600A, manufactured by Toutoku Toryo Co., Ltd., tensile modulus at 25° C.: 2,500 MPa), and that the thickness of the thermosetting resin layers and the shape and the thickness of the thermoplastic resin layer would be changed to those shown in Table 1.

Example 6

In Example 6, the insulated wire was produced, of the cross-sectional around rectangular shape, as shown in FIG. 4(a).

The insulated wire was produced in the same manner as in Example 1, except that the resin of the thermosetting resin layers was changed to polyimide (PI) varnish (trade name: U-VARNISH-A, manufactured by Ube Industries, Ltd., tensile modulus at 25° C.: 3,730 MPa), and that the thickness of the thermosetting resin layers and the shape and the thickness of the thermoplastic resin layer would be changed to those shown in Table 1.

Example 7

In Example 7, the insulated wire was produced, of the cross-sectional around rectangular shape, as shown in FIG. 4(a).

The insulated wire was produced in the same manner as in Example 1, except that the resin of the thermosetting resin layers was changed to polyester (PEst) varnish (trade name: LITON3300KF, manufactured by Toutoku Toryo Co., Ltd., tensile modulus at 25° C.: 2,000 MPa), that the thermoplastic resin was changed to polyamide (PA) (trade name: LEONA1300S, manufactured by Asahi Kasei Corporation), respectively, and that the thickness of the thermosetting resin layers and the shape and the thickness of the thermoplastic resin layer would be changed to those shown in Table 1.

Example 8

In Example 8, the insulated wire was produced, of the cross-sectional around rectangular shape, as shown in FIG. 4(a).

The insulated wire was produced in the same manner as in Example 1, except that the thickness of the thermosetting resin layers and the shape and the thickness of the thermoplastic resin layer would be changed to those shown in Table 1.

Comparative Example 1

In Comparative Example 1, the insulated wire was produced, except for having 2 long sides of the cross-sectional uneven quadrilateral, as shown in FIG. 4(b), each of which had an insulating layer in which a difference between the maximum value and the minimum value of the coating thickness was more than 20 μm.

In Comparative Example 1, the insulated wire was not provided with the thermosetting resin layers but only had the thermoplastic resin layer.

On the conductor that was used in Example 1, the thermoplastic resin layer was formed on the outer periphery of the core wire, with using the extruder equipped with a 30 mm-full flight screw (screw L/D=25, screw compression ratio=3). As the thermoplastic resin, use was made of polyetheretherketone (trade name: KetaSpire KT-820, manufactured by Solvay Specialty Polymers), and extrusion-covering of the thermoplastic resin was carried out at 370° C. (the temperature of extrusion die), with using the extrusion die in a manner such that the outer cross-sectional shape and the thickness of the thermoplastic resin layer would be those shown in Table 2.

Thus, the insulated wire was prepared, which had the thermoplastic resin layer, which was provided on the conductor.

Comparative Example 2

In Comparative Example 2, the insulated wire was produced, except for having 2 long sides of the cross-sectional uneven quadrilateral, as shown in FIG. 4(c), each of which had the insulating layer in which a difference between the maximum value and the minimum value of the coating thickness was more than 20 μm.

In Comparative Example 2, the insulated wire was not provided with the thermosetting resin layers but only had the thermoplastic resin layer.

The insulated wire was produced in the same manner as in Comparative Example 1, except that the shape and the thickness of the thermoplastic resin layer would be changed to those shown in Table 2.

Comparative Example 3

In Comparative Example 3, the insulated wire was produced, of the cross-sectional around rectangular shape, as shown in FIG. 4(a).

In Comparative Example 3, the insulated wire was not provided with the thermosetting resin layers but only had the thermoplastic resin layer.

The insulated wire was produced in the same manner as in Comparative Example 1, except that the shape and the thickness of the thermoplastic resin layer would be changed to those shown in Table 2.

Comparative Example 4

In Comparative Example 4, the insulated wire was produced, of the cross-sectional around rectangular shape, as shown in FIG. 4(a).

The insulated wire was produced in the same manner as in Example 1, except that the thickness of the thermosetting resin layers and the shape and the thickness of the thermoplastic resin layer would be changed to those shown in Table 2.

Comparative Example 5

In Comparative Example 5, the insulated wire was produced, except for having all the 4 sides of the cross-sectional uneven quadrilateral, as shown in FIG. 4(c), each of which had the insulating layer in which a difference between the maximum value and the minimum value of the coating thickness was more than 20 μm.

The insulated wire was produced in the same manner as in Example 1, except that the thickness of the thermosetting resin layers and the shape and the thickness of the thermoplastic resin layer would be changed to those shown in Table 2.

Comparative Example 6

In Comparative Example 6, the insulated wire was produced, of the cross-sectional around rectangular shape, as shown in FIG. 4(a).

The insulated wire was produced in the same manner as in Example 1, except that the thickness of the thermosetting resin layers and the shape and the thickness of the thermoplastic resin layer would be changed to those shown in Table 2.

<Measurement, Evaluation>

With respect to each of the thus-obtained insulated wires, the tensile elastic modulus at 25° C. of the thermosetting resin and the coating thickness were measured.

Further, with respect to those insulated wires, measurement of the partial discharge inception voltage (PDIV), and evaluation of the breakdown voltage (BDV) and the in-slot space factor were conducted as follows.

[Measurement of Tensile Elastic Modulus]

For measuring a tensile elastic modulus of the thermosetting resin, use was made of: a preliminarily-prepared sheet sample having the dimensions of 10 mm length, 4 mm width and 0.05 mm thickness. The tensile elastic modulus at 25° C. was measured and recorded, by measuring this sheet sample, using a viscoelastic spectrometer (DMA8000) manufactured by Perkin Elmer Japan Co., Ltd., under the conditions: measurement mode, tensile mode; frequency, 1 Hz; and measurement temperature, with a change in the temperature at a temperature increase rate of 5° C./min.

[Measurement of Coating Thickness]

(1) Coating Thickness of Thermosetting Resin Layer

Use was made of: an enamel wire composed of the thermosetting resin layers obtained in the production process of each insulated wire. 4 sides of the cross-sectional shape in FIGS. 4(a) to 4(c) were designated as T1 to T4 as shown in FIGS. 4(a) to 4(c). An average coating thickness of the thermosetting resin layers (in Table, those layers are described as inner layers) was measured, by an analysis of the image at 500-fold magnification, in the 4 sides other than the portions curved by a curvature of the chamfer of 4 corners based on the conductor cross-sectional shape, using a microscope (VHX-2000) manufactured by Keyence Corporation.

Herein, the average coating thickness means an average value of the coating thicknesses at 10 points equally spaced in each side, with respect to the inner layers and the covering layers each having been covered on the 4 sides other than the portions curved by the curvature of the chamfer of 4 corners based on the conductor cross-sectional shape.

(2) Coating Thickness of Covering Layer

Each of the insulated wires was used. 4 sides of the cross-sectional shape in FIGS. 4(a) to 4(c) were designated as T1 to T4 as shown in FIGS. 4(a) to 4(c). A coating thickness of the covering layer was measured, by an analysis of the image at 500-fold magnification in the 4 sides other than the portions curved by a curvature of the chamfer of 4 corners based on the conductor cross-sectional shape, using a microscope (VHX-2000) manufactured by Keyence Corporation.

In each side, the maximum value and the minimum value of the coating thickness of the covering layer were measured. T1 to T4 in FIGS. 4(a) to 4(c) were designated respectively as Side 1 to Side 4, and the maximum value in each side was indicated by putting a symbol "'" to each of T1 to T4 and the minimum value in each side was indicated by putting a symbol "''" to each of T1 to T4. For example, in the Side 1 of T1, the maximum value was indicated by T1', and the minimum value was indicated by T1".

A difference between the maximum value and the minimum value in each side, for example, Δ=T1'−T1" in the Side 1 of T1, was calculated.

On the other hand, a value (Tmax/Tmin) of the maximum value (Tmax) of the maximum values in the 4 sides divided by the minimum value (Tmin) of the minimum values in the 4 sides was calculated. This value was indicated by an "All-around coating thickness ratio" in Tables 1 and 2.

[Measurement of Partial Discharge Inception Voltage (PDIV)]

The partial discharge inception voltage of each insulated wire was measured, using a partial discharge tester [trade name: KPD2050, manufactured by Kikusui Electronics Corporation], under 2 kinds of the conditions described below.

Figure 5A:
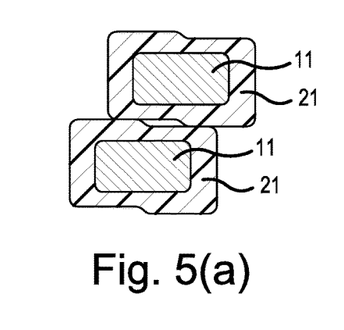
FIGS. 5(a) and 5(b) each are a schematic pattern layout drawing of 2 insulated wires in measurement of the partial discharge inception voltage (PDIV) as evaluated in Examples.
Figure 5B:
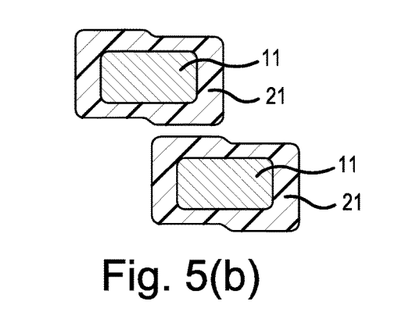

(1) A Partial Discharge Inception Voltage at the Minimum Side Portion Containing the Minimum Value of the Coating Thickness at the Long Side This partial discharge inception voltage is a partial discharge inception voltage under the conditions that, as schematically shown in FIG. 5(a), of the portions of 2 segments of the insulated wires corresponding to T1 and T3 of FIGS. 5(a) and 5(b). That is, a thick portion containing the maximum value of the coating thickness of the covering layer of one insulated wire and a thin portion containing the minimum value of the coating thickness of the covering layer of another insulated wire have been layered with a shift of the layers by 10 μm, whereby a gap at the center of the laminated layers can be formed.

Under the above-described conditions of the insulated wires, an electrode was connected between the two conductors, and while applying an alternating-current voltage having 50-Hz between them at 25° C., voltage was continuously raised, and the voltage when a partial discharge of 10 pC generated was measured at a peak voltage (Vp).

(2) A Partial Discharge Inception Voltage at the Maximum Coating Thickness Portion Containing the Maximum Value of the Coating Thickness at the Long Side This partial discharge inception voltage is a partial discharge inception voltage measured in an environment that, as schematically shown in FIG. 5(b), of the potions of 2 segments of the insulated wires corresponding to T1 and T3 of FIGS. 5(a) and 5(b). That is, a thick portion containing the maximum value of the coating thickness of the covering layer of one insulated wire and a thick portion containing the maximum value of the coating thickness of the covering layer of another insulated wire have been layered with a distance between end portions of the 2 segments of the insulated wires being broadened, whereby a variety of any of air gaps exists.

Under the above-described conditions of the insulated wires, an electrode was connected between the two conductors, and while applying an alternating-current voltage having 50-Hz between them at 25° C., voltage was continuously raised, and the voltage when a partial discharge of 10 pC generated was measured at a peak voltage (Vp).

Meanwhile, in Tables 1 and 2, the above-described (1) was indicated by "Partial discharge inception voltage (Vp) with a shift of the minimum side portion by 10 μm" and the above-described (2) was indicated by "Partial discharge inception voltage (Vp) at the maximum coating thickness portion".

[Evaluation of Breakdown Voltage (BDV)]

After subjecting each insulated wire to the notched edgewise bending, the breakdown voltage was measured.

(Notched Edgewise Bending)

A notched edgewise bending was conducted, according to "Winding wires-test method" in conformity with JIS C 3216-3:2011.

The above-described "Winding wires-test method" is also called as the notched edgewise bending test, and expresses a bending way to bend one of edge surfaces of the insulated wire in the way of a bore, or also expresses a bending way to bend the insulated wire in the across-width direction. Herein, a surface at which a short side of the longitudinal section of the rectangular insulated wire continuously forms in the direction of axis is expressed by "an edge surface", and a surface at which a long side of the longitudinal section of the rectangular insulated wire continuously forms in the direction of axis, is expressed by "a flat surface".

Meanwhile, the notched edgewise bending test is a simulation test of the bending and the stretch at the winding process of the insulated wire and further a test of evaluating the prevention effect of cracks arriving at the conductor due to a mechanical stress remaining after the processing.

(Measurement of Breakdown Voltage (BDV))

The breakdown voltage of the insulated wire was evaluated, by measuring a voltage of the sample after the above-described notched edgewise bending test, by using a breakdown voltage tester.

Specifically, a ground electrode was connected to a portion of the insulated wire of which one sided terminal was stripped off, and a portion having been subjected to the edgewise bending test was buried into copper grain, and a high-pressure side electrode was connected to the copper grain. While continuously raising a voltage at a voltage increase rate of 500V/sec, the voltage when an electric current of 15 mA or more flowed was measured. The measurement was conducted at n=5. An average of the breakdown voltage was evaluated, in accordance with the following evaluation criteria.

Evaluation Criteria
A: 8 kV or higher
B: 5 kV or higher, and less than 8 kV
C: 1 kV or higher, and less than 5 kV
D: less than 1 kV The above ranks 'C' or higher are to pass the test.

[Evaluation of In-Slot Space Factor]

The in-slot space factor under the conditions that each insulated wire was stored in a slot 32 of the stator core 31 for incorporating a motor coil, as shown in FIG. 6(a), was measured.

Specifically, a ratio (%) of a sum of the conductor height to maximum overall height in the laminate direction of the in-slot insulated wire was measured, in accordance with the following evaluation criteria.

Evaluation Criteria
A: more than 94%, and 100% or less
B: more than 90%, and 94% or less
C: more than 86%, and 90% or less
D: 86% or less The above ranks 'C' or higher are to pass the test.

The thus-obtained results are collectively shown in Tables 1 and 2. Herein, the expression indicates 'unused', 'the value is 0', or 'not evaluated due to absence of the intended layer'.

TABLE 1

|  |  | Ex. 1 | Ex. 2 | Ex. 3 | Ex. 4 |
|---|---|---|---|---|---|
| Coating material | Inner layer: kind of thermosetting resin | PAI | PAI | PI | PEst |
|  | Tensile modulus of thermosetting resin (MPa at 25° C.) | 4100 | 4100 | 3730 | 2000 |
|  | Outer layer: kind of thermoplastic resin | PEEK | PEEK | PEEK | PPS |
| Side 1 | Inner layer: av. coating thickness (T1) (μm) | 30 | 20 | 40 | 30 |
|  | Covering layer: Maximum coating thickness of Side 1 (T1') (μm) | 110 | 50 | 110 | 110 |
|  | Covering layer: Minimum coating thickness of Side 1 (T1") (μm) | 105 | 40 | 90 | 100 |
|  | Coating thickness: Δ T1' − T1" (μm) | 5 | 10 | 20 | 10 |
| Side 2 | Inner layer: av. coating thickness (T2) (μm) | 30 | 20 | 40 | 30 |
|  | Covering layer: Maximum coating thickness of Side 2 (T2') (μm) | 70 | 90 | 250 | 50 |
|  | Covering layer: Minimum coating thickness of Side 2 (T2") (μm) | 65 | 85 | 240 | 45 |
|  | Coating thickness: Δ T2' − T2" (μm) | 5 | 5 | 10 | 5 |
| Side 3 | Inner layer: av. coating thickness (T3) (μm) | 30 | 20 | 40 | 30 |
|  | Covering layer: Maximum coating thickness of Side 3 (T3') (μm) | 110 | 50 | 110 | 110 |
|  | Covering layer: Minimum coating thickness of Side 3 (T3") (μm) | 105 | 40 | 90 | 100 |
|  | Coating thickness: Δ T3' − T3" (μm) | 5 | 10 | 20 | 10 |
| Side 4 | Inner layer: av. coating thickness (T4) (μm) | 30 | 20 | 40 | 30 |
|  | Covering layer: Maximum coating thickness of Side 4 (T4') (μm) | 70 | 90 | 250 | 50 |
|  | Covering layer: Minimum coating thickness of Side 4 (T4") (μm) | 65 | 85 | 240 | 45 |
|  | Coating thickness: Δ T4' − T4" (μm) | 5 | 5 | 10 | 5 |
| All-around coating thickness ratio | Covering layer: Tmax/Tmin | 1.69 | 2.25 | 2.78 | 2.44 |
| Shape of cross-sectional coating | Characteristic of shape | Around rectangular | Around rectangular | Around rectangular | Around rectangular |
| Measurement | PDIV at the minimum side portion shifted by 10 μm (Vp) | 2716 | 1799 | 1657 | 2029 |
|  | PDIV at the maximum coating thickness portion (Vp) | 1351 | 1213 | 2181 | 1318 |
|  | BVD after notched edgewise bending | B | B | A | B |
|  | In-slot space factor | B | B | C | A |

|  |  | Ex. 5 | Ex. 6 | Ex. 7 | Ex. 8 |
|---|---|---|---|---|---|
| Coating material | Inner layer: kind of thermosetting resin | PEsI | PI | PEst | PAI |
|  | Tensile modulus of thermosetting resin (MPa at 25° C.) | 2500 | 3730 | 2000 | 4100 |
|  | Outer layer: kind of thermoplastic resin | PEEK | PEEK | PA | PEEK |
| Side 1 | Inner layer: av. coating thickness (T1) (μm) | 50 | 40 | 15 | 20 |
|  | Covering layer: Maximum coating thickness of Side 1 (T1') (μm) | 150 | 105 | 115 | 50 |
|  | Covering layer: Minimum coating thickness of Side 1 (T1") (μm) | 135 | 90 | 100 | 40 |
|  | Coating thickness: Δ T1' − T1" (μm) | 15 | 15 | 15 | 10 |
| Side 2 | Inner layer: av. coating thickness (T2) (μm) | 50 | 40 | 15 | 20 |
|  | Covering layer: Maximum coating thickness of Side 2 (T2') (μm) | 90 | 105 | 55 | 200 |
|  | Covering layer: Minimum coating thickness of Side 2 (T2") (μm) | 75 | 90 | 50 | 190 |
|  | Coating thickness: Δ T2' − T2" (μm) | 15 | 15 | 5 | 10 |
| Side 3 | Inner layer: av. coating thickness (T3) (μm) | 50 | 40 | 15 | 20 |
|  | Covering layer: Maximum coating thickness of Side 3 (T3') (μm) | 150 | 90 | 115 | 50 |
|  | Covering layer: Minimum coating thickness of Side 3 (T3") (μm) | 135 | 80 | 100 | 40 |
|  | Coating thickness: Δ T3' − T3" (μm) | 15 | 10 | 15 | 10 |
| Side 4 | Inner layer: av. coating thickness (T4) (μm) | 50 | 40 | 15 | 20 |
|  | Covering layer: Maximum coating thickness of Side 4 (T4') (μm) | 90 | 85 | 55 | 200 |
|  | Covering layer: Minimum coating thickness of Side 4 (T4") (μm) | 75 | 85 | 50 | 190 |
|  | Coating thickness: Δ T4' − T4" (μm) | 15 | 0 | 5 | 10 |
| All-around coating thickness ratio | Covering layer: Tmax/Tmin | 2.00 | 1.31 | 2.30 | 5.00 |
| Shape of cross-sectional coating | Characteristic of shape | Around rectangular | Around rectangular | Around rectangular | Around rectangular |
| Measurement | PDIV at the minimum side portion shifted by 10 μm (Vp) | 1435 | 2024 | 1297 | 1799 |
|  | PDIV at the maximum coating thickness portion (Vp) | 1569 | 1268 | 1123 | 1213 |
|  | BVD after notched edgewise bending | A | A | C | B |
|  | In-slot space factor | B | B | A | A |

Note:
Ex. means Example according to this invention.

TABLE 2

|  |  | C Ex. 1 | C Ex. 2 | C Ex. 3 | C Ex. 4 | C Ex. 5 | C Ex. 6 |
|---|---|---|---|---|---|---|---|
| Coating material | Inner layer: kind of thermosetting resin | — | — | — | PAI | PAI | PAI |
|  | Tensile modulus of thermosetting resin (MPa at 25° C.) | — | — | — | 4100 | 4100 | 4100 |
|  | Outer layer: kind of thermoplastic resin | PEEK | PEEK | PEEK | PEEK | PEEK | PEEK |
| Side 1 | Inner layer: av. coating thickness (T1) (μm) | — | — | — | 50 | 40 | 3 |
|  | Covering layer: Maximum coating thickness of Side 1 (T1') (μm) | 100 | 150 | 150 | 150 | 150 | 40 |
|  | Covering layer: Minimum coating thickness of Side 1 (T1") (μm) | 50 | 125 | 140 | 140 | 125 | 35 |
|  | Coating thickness: Δ T1' − T1" (μm) | 50 | 25 | 10 | 10 | 25 | 5 |
| Side 2 | Inner layer: av. coating thickness (T2) (μm) | — | — | — | 50 | 40 | 3 |
|  | Covering layer: Maximum coating thickness of Side 2 (T2') (μm) | 85 | 150 | 80 | 150 | 80 | 40 |

TABLE 2-continued

|  |  | C Ex. 1 | C Ex. 2 | C Ex. 3 | C Ex. 4 | C Ex. 5 | C Ex. 6 |
|---|---|---|---|---|---|---|---|
|  | Covering layer: Minimum coating thickness of Side 2 (T2″) (μm) | 80 | 135 | 70 | 140 | 60 | 35 |
|  | Coating thickness: Δ T2′ − T2″ (μm) | 5 | 15 | 10 | 10 | 20 | 5 |
| Side 3 | Inner layer: av. coating thickness (T3) (μm) | — | — | — | 50 | 40 | 3 |
|  | Covering layer: Maximum coating thickness of Side 3 (T3′) (μm) | 100 | 150 | 150 | 150 | 150 | 40 |
|  | Covering layer: Minimum coating thickness of Side 3 (T3″) (μm) | 50 | 125 | 140 | 140 | 125 | 35 |
|  | Coating thickness: Δ T3′ − T3″ (μm) | 50 | 25 | 10 | 10 | 25 | 5 |
| Side 4 | Inner layer: av. coating thickness (T4) (μm) | — | — | — | 50 | 40 | 3 |
|  | Covering layer: Maximum coating thickness of Side 4 (T4′) (μm) | 85 | 150 | 80 | 150 | 80 | 40 |
|  | Covering layer: Minimum coating thickness of Side 4 (T4″) (μm) | 80 | 135 | 70 | 140 | 60 | 35 |
|  | Coating thickness: Δ T4′ − T4″ (μm) | 5 | 15 | 10 | 10 | 20 | 5 |
| All-around coating thickness ratio | Covering layer: Tmax/Tmin | 2.00 | 1.20 | 2.14 | 1.07 | 2.50 | 1.14 |
| Shape of cross-sectional coating | Characteristic of shape | Uneven quadrilateral | Uneven quadrilateral | Around rectangular | Around rectangular | Uneven quadrilateral | Around rectangular |
| Measurement | PDIV at the minimum side portion shifted by 10 μm (Vp) | 986 | 1849 | 1860 | 3115 | 1069 | 1092 |
|  | PDIV at the maximum coating thickness portion (Vp) | 1213 | 1595 | 1627 | 1550 | 1458 | 875 |
|  | BVD after notched edgewise bending | D | D | D | A | A | D |
|  | In-slot space factor | A | D | B | D | D | A |

Note:
C Ex. means Comparative Example.

From Tables 1 and 2, it is found that in the insulated wires of Examples 1 to 8 having the structure of the present invention, a partial discharge inception voltage (PDIV) under 2 conditions is a voltage as high as 1,100 Vp or more; and a breakdown voltage (BDV) after the notched edgewise bending is also excellent; and further an in-slot space factor is also high, as compared to the insulated wires of Comparative Examples 1 to 6.

In contrast, in the insulated wire of Comparative Example 1, which had the cross-sectional uneven rectangular shape as shown in FIG. 4(b), and which had one resin layer as a covering layer, as described in JP-A-2009-232607, the partial discharge inception voltage (Vp) measured with a shift of the minimum side portion by 10 μm in the above-described (1) was a voltage as low as 986 Vp, and the breakdown voltage (BDV) after the notched edgewise bending was also poor.

Further, the insulated wire of Comparative Example 2, in which the cross-sectional shape of the insulated wire of Comparative Example 1 was replaced with the uneven quadrilateral as shown in FIG. 4(c), was poor, in terms of the breakdown voltage (BDV) after the notched edgewise bending and the in-slot space factor.

On the other hand, the insulated wire of Comparative Example 5, having the cross-sectional shape of the uneven quadrilateral as shown in FIG. 4(c) and also having even two-layered covering layers composed of the thermosetting resin layer and the thermoplastic resin layer, was poor, in terms of in-slot space factor; and (1) of the partial discharge inception voltage (Vp) with a shift of the minimum side portion by 10 μm as low as 1069 Vp, as compared to the insulated wires of Examples 1 to 8.

The insulated wire of Comparative Example 3 in which the cross-sectional shape was an approximate quadrilateral as shown in FIG. 4(a), but the covering layer was only one thermoplastic resin layer without having any thermosetting resin layer, was poor, in terms of the breakdown voltage (BDV) after the notched edgewise bending. Even though the value of Tmax/Tmin was as high as 2.14, and the in-slot space factor and the partial discharge inception voltage were remained at the high levels, cracking extended to the conductor after the notched edgewise bending, because the covering layer was composed of only the thermoplastic resin layer. Consequently, the insulated wire of Comparative Example 3 was difficult to maintain the breakdown voltage at a required level.

Neither the insulated wires of Comparative Example 4 or 6, although their cross-sectional shapes each were an approximate quadrilateral as shown in FIG. 4(a), did not satisfy a requirement that a value (Tmax/Tmin) of the maximum value (Tmax) divided by the minimum value (Tmin) of the coating thickness of the covering layers in the whole sides, was 1.3 or more. In the insulated wire of Comparative Example 4, the in-slot space factor was poor, and in the insulated wire of Comparative Example 6, the partial discharge inception voltage (PDIV) under 2 conditions was poor and the breakdown voltage (BDV) after the notched edgewise bending was poor. Meanwhile, it is considered that because the coating thickness of the covering layer thereof was thin overall, the insulated wire of Comparative Example 6 was poor, in terms of the partial discharge inception voltage (PDIV) and the breakdown voltage (BDV), while it was excellent in terms of the in-slot space factor.

From the above-described results, it is found that the insulated wire of the present invention can be preferably used as a coil in the field required for excellent electrical property [partial discharge inception voltage (PDIV) and breakdown voltage (BDV)] and required for both useful and effective storage due to minimization of a wasted space, such as a rotating electric machine and a variety of electrical or electronic equipment, particularly as a coil for a motor, a transformer, and the like; and as a winding wire for a driving motor of the hybrid vehicle (HV) and the electric vehicle EV.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2016-029455 filed in Japan on Feb. 19, 2016, which is entirely herein incorporated by reference.

REFERENCE SIGNS LIST

1 Insulated wire
11 Conductor

21 Covering layer
   21a Thermosetting resin layer
   21b Thermoplastic resin layer
30 Stator
31 Stator core
32 Slot
33 Coil
34 Wire segment
   34a Open end (terminal)

The invention claimed is:

1. An insulated wire, comprising at least one thermosetting resin layer and at least one thermoplastic resin layer in this order, as covering layers, on a conductor having a quadrilateral cross-section,
wherein, in each of 4 covering layer portions corresponding to 4 sides of the cross-section of said insulated wire, a difference between the maximum value and the minimum value of a coating thickness is each 20 μm or less, and in the whole of the above 4 covering layer portions, a value of the maximum value divided by the minimum value of the coating thickness is 1.3 or more.

2. The insulated wire as claimed in claim 1, wherein, in each of the 4 covering layer portions, an average coating thickness of the thermosetting resin layer is 5 μm or more.

3. The insulated wire as claimed in claim 1, wherein the covering layer portion giving the maximum value of the coating thickness in the whole of the above 4 covering layer portions, and the covering layer portion giving the minimum value of the coating thickness in the whole of the above 4 covering layer portions, lie next to each other.

4. The insulated wire as claimed in claim 1, wherein, in the cross-section of the insulated wire, an average of the maximum value and the minimum value of the coating thickness of a pair of the covering layer portions corresponding to long sides facing each other is thinner than an average of the maximum value and the minimum value of the coating thickness of a pair of the covering layer portions corresponding to short sides facing each other.

5. The insulated wire as claimed in claim 1, wherein a thermosetting resin which constitutes the thermosetting resin layer is selected from the group consisting of polyamideimide and polyimide.

6. The insulated wire as claimed in claim 1, wherein a tensile elastic modulus at 25° C. of a thermosetting resin which constitutes the thermosetting resin layer is 2,000 MPa or more.

7. The insulated wire as claimed in claim 1, wherein a thermoplastic to resin which constitutes the thermoplastic resin layer comprises polyetheretherketone or polyphenylenesulfide.

8. A motor coil comprising a lamination of more than one of the insulated wires as claimed in claim 1.

9. An electrical or electronic equipment, comprising a built-in laminated body of more than one of the insulated wires as claimed in claim 1.

* * * * *